US006763237B1

(12) United States Patent
Katz

(10) Patent No.: US 6,763,237 B1
(45) Date of Patent: Jul. 13, 2004

(54) METHOD AND APPARATUS FOR THE SELECTION OF RADIO TRANSMISSION RESOURCES

(75) Inventor: Marcos Katz, Oulu (FI)

(73) Assignee: Nokia Networks Oy, Espoo (FI)

(*) Notice: Subject to any disclaimer, the term of this patent is extended or adjusted under 35 U.S.C. 154(b) by 0 days.

(21) Appl. No.: 10/018,171

(22) PCT Filed: Sep. 14, 1999

(86) PCT No.: PCT/EP99/06779

§ 371 (c)(1),
(2), (4) Date: Apr. 23, 2002

(87) PCT Pub. No.: WO00/67510

PCT Pub. Date: Nov. 9, 2000

(30) Foreign Application Priority Data

May 1, 1999 (EP) ............................................. 9903093

(51) Int. Cl.$^7$ ................................................. H04Q 7/20
(52) U.S. Cl. .................... 455/450; 455/509; 455/562.1; 370/329; 370/345
(58) Field of Search ................................. 455/450, 451, 455/452.1, 453, 454, 455, 509, 561, 562.1, 269, 272, 277.1, 101; 370/329, 330, 431, 436, 437, 345, 347

(56) References Cited

U.S. PATENT DOCUMENTS

| 5,579,306 A | * 11/1996 | Dent ........................... 370/330 |
| 5,649,293 A | 7/1997 | Reed ........................... 455/453 |
| 6,327,481 B1 | * 12/2001 | Nagashima .................. 455/562 |

FOREIGN PATENT DOCUMENTS

| EP | 0777400 A2 | 6/1997 |
| EP | 0876074 A1 | 11/1998 |
| WO | WO95/22210 | 8/1995 |
| WO | WO96/37969 | 11/1996 |
| WO | WO98/13952 | 4/1998 |
| WO | WO99/60809 | 11/1999 |

* cited by examiner

Primary Examiner—Quochien B. Vuong
(74) Attorney, Agent, or Firm—Ohlandt, Greeley, Ruggiero & Perle L.L.P.

(57) ABSTRACT

A method of selecting radio transmission resources of a first station for communicating between the first station and a plurality of second stations in a wireless communications network. The method comprises the steps of grouping the plurality of second stations based on a traffic characteristic of respective ones thereof, and selecting at the first station radio transmission resources for communication with the second stations such that the transmission resources are used substantially equally within each group.

22 Claims, 6 Drawing Sheets

SYNCHRONOUS AND ASYNCHRONOUS TIME SLOT TRANSMISSION

PRINCIPLE OF THE TSTD SCHEME

SIMULATION OF PA LOADING IN TSTD WITH a) K =10 USERS AND b) K = 50 USERS

STATISTICAL DISTRIBUTION OF POWER IN THE iTH PA (i=1,2) FOR $K_1$ USERS WITH POWER $P_1$ AND $K_2$ USERS WITH POWER $P_2$ a)$K_1$=12, $K_2$=1, $P_2/P_1$=10, b)$K_1$=12, $K_2$=2, $P_2/P_1$=10 c)$K_1$=12, $K_2$=3, $P_2/P_1$=10.

EXAMPLES OF TRANSMIT RESOURCE SELECTION
IN A MIXED-TRAFFIC ENVIRONMENT

FURTHER EXAMPLES OF TRANSMIT RESOURCE
SELECTION WITH TWO GROUPS

METHOD AND APPARATUS FOR THE SELECTION OF RADIO TRANSMISSION RESOURCES

This invention relates to the selection of radio transmission resources in for example a transceiver station of a wireless cellular communications network.

The area covered by a cellular network is divided into a plurality of cells or cell sectors. Each cell is served by a base station which transmits signals to and receives signals from mobile stations located in the cell or cell sector. Base transceiver stations of cellular communications networks may have two or more antenna elements mounted at a certain distance from one another. Such arrangements exploit space diversity and reduce the effects of multipath fading. A downlink transmission technique suitable for use with transceiver stations having two or more antenna elements can involve periodically switching transmission from one antenna element to another according to a predetermined scheme. These types of transmission techniques are referred to herein as "time switched transmit diversity" (TSTD) schemes. Time switched transmit diversity schemes are potentially useful in third generation mobile systems such as wide band code division multiple access (WCDMA) systems, for example systems operating to the Japanese ARIB specification, because they offer good performance with minimal implementation complexity.

Each transmitting antenna element of a transceiver station is connected to circuitry which is sensitive to the electrical loading conditions resulting from the antenna selection scheme. For example, in many transceiver station configurations each transmitting antenna element is connected to a power amplifier. The distribution of power across the power amplifiers depends upon the number of users (e.g. mobile stations) connected to each transmission branch. Power loading is a critical issue because the loading conditions dictate characteristics which the power amplifiers are required to possess. When selecting a power amplifier for a given application it is necessary to consider the mean power requirements and also the maximum amount of power (peak power) the amplifier will be required to withstand. Peak power loading results when a given transmission branch is selected to serve a large number of users simultaneously. It is necessary to select power amplifiers designed with correspondingly high crest factors CF (CF=Peak Power/Average Power). This design constraint can be relaxed if the electrical load can be evenly distributed between the available power amplifiers, thereby avoiding problematic power imbalances or high peak loads in any particular branch.

FIGS. 1a and 1b illustrate two different scenarios which have implications for electrical load balancing in multi-antenna systems. FIG. 1a shows a situation in which a given user transmits in successive time slots and the respective time slots of the different users #1 to #4 are synchronised in time. Corresponding time slots of the plurality of connected users have common start and end times. FIG. 1b shows an alternative situation in which the respective users operate on an asynchronous basis. In this case, corresponding time slots of the respective users do not share common start and end times. According to both the scenarios of FIG. 1a and FIG. 1b, if the mean electrical load is evenly distributed, the mean power supplied by each power amplifier of a two antenna system is equal to $KP/2$, where P is the power transmitted to one user and K is the number of users.

It will be appreciated that the synchronous case can be particularly problematic because a given power amplifier loading condition lasts for the entire duration of the time slot (or transmission burst). Frames in wide band code division multiple access systems are not necessarily "synchronised" because a time slot system such as that in GSM is not employed. However a similar condition can be envisaged with a given power loading being maintained for the duration of a given power amplifier selection condition. Power amplifier selection conditions such as those seen with the frames of wide band code division multiple access systems tend in practice to be shorter than conventional GSM time slots.

According to an aspect of the present invention there is provided a method of selecting radio transmission resources of a first station for communicating between said first station and a plurality of second stations in a wireless communications network, the method comprising the steps of grouping said plurality of second stations based on a traffic characteristic of respective ones thereof and selecting at said first station radio transmission resources for communication with said second stations such that said transmission resources are used substantially equally within each said group.

Preferably, the plurality of second stations are grouped based on a characteristic indicative of the relative power requirements thereof. For example, the data transfer rate characteristic is a useful indication of the relative power requirements of mobile stations and the stations may be grouped such that all stations which belong to a given group operate at substantially equal data transfer rates.

Preferably, predetermined rules are applied within each of the defined groups to manage the selection of transmission resources at the first station.

In certain embodiments, the radio transmission resources selected from comprise two or more transmission branches for transmission from said first station to said second stations wherein transmission schemes employed switch between respective transmission branches according to a predetermined pattern. Typically, each of said transmission branches is connected to antenna switching circuitry. Each of the transmission branches comprises an antenna element. This arrangement can be found in, for example, multi-antennae transmission arrangements exploiting space diversity. That is systems in which antennae are separated in space to allow the use of diversity such that the radio channels associated with each antenna are non-correlated. Each of the transmission branches comprises a power amplifier for supplying signal power to the antenna of the same transmission branch under the control of the antenna switching circuitry.

Preferably, the selection of transmission resources is controlled within each group by making an initial antenna selection at said first station for each new second station establishing a link based on at least one previous event influencing the balance of power between said transmission branches. For Example, whenever one of said plurality of second stations establishes a new link and the preceding event which occurred in the relevant group was the establishment of a link, a different initial antenna selection is made to that which was made when the preceding link was established. Likewise, whenever one of said plurality of second stations establishes a link and the preceding event which occurred in the relevant group was the termination of a link, the initial antenna selection for the new link is made such that it is the same as the initial antenna selection made in respect of the previously terminated link.

More sophisticated embodiments ensure that within each group the initial antenna selection is made for a new link based on the loading conditions of the transmission branches at that time. For example, a counter associated with each group monitors the loading conditions of the transmission branches for that group. A count of zero indicates substantially balanced loading conditions for the group in question. Accordingly, whenever one of said plurality of second stations establishes a link and the count resulting from the preceding event in the group is less than zero, the first antenna is selected and the count is incremented by one. Whenever one of said plurality of second stations establishes a link and the count resulting from the preceding event which occurred in the relevant group is greater than zero, the second antenna is selected and the count is decremented by one. Whenever one of said plurality of second stations establishes a link and the count resulting from the preceding event which occurred in the relevant group is equal to zero, the first antenna is selected as the initial antenna and the count is incremented by one or the second antenna is selected as the initial antenna and the counter is decremented by one. In such embodiments, the count is incremented by one each time one of said plurality of second stations terminates a link for which the second antenna was the initial antenna selection. Similarly, the count is decremented by one each time one of said plurality of second stations terminates a link for which the first antenna was the initial antenna selection.

Preferably, the method is used to select between first and second transmission antennae in a system employing diversity transmission.

In other embodiments, the radio transmission resources selected implement the direction of transmission in a system employing spatial division of radio channels by means of one or more phased antenna arrays.

According to another aspect of the present invention, there is provided a method of selecting radio transmission resources of a first station for communicating between said first station and a plurality of second stations in a wireless communications network, the method comprising the steps of grouping said second stations into a plurality of groups based on a traffic characteristic of respective ones thereof and managing the selection of said transmission resources at said first station such that said transmission resources are used substantially equally by said second stations within each said group.

According to another aspect of the present invention, there is provided a method for selecting radio transmission resources of a first station for communicating between said first station and a plurality of second stations in a wireless communications network, the method comprising the steps of grouping said plurality of second stations based on a traffic characteristic of respective ones thereof and selecting at said first station radio transmission resources based on at least one previous event occurring within a group.

According to another aspect of the present invention, there is provided a method of selecting radio transmission resources of a first station for communicating between said first station and a plurality of second stations in a wireless communications network, the method comprising the steps of grouping said plurality of second stations based on a traffic characteristic of respective ones thereof and selecting at said first station radio transmission resources based on current usage of said transmission resources by said second stations within each said group.

According to another aspect of the present invention, there is provided a transceiver comprising circuitry for selecting radio transmission resources of said transceiver for communicating between said transceiver and a plurality of second stations in a wireless communications network, the transceiver comprising means for determining groups of said plurality of second stations based on a traffic characteristic of said second stations and means for selecting at the first station radio transmission resources for communication with said second stations such that said transmission resources are used substantially equally within each said group.

According to another aspect of the present invention there is provided a method of selecting between first and second transmission antenna elements of a first station for communicating between said first station and a plurality of second stations in a wireless communications network employing diversity transmission, the method comprising the steps of grouping said plurality of second stations based on a traffic characteristic of respective ones thereof and selecting at said first station an antenna element for communication with said second stations such that said transmission antennae are used substantially equally within each said group.

According to another aspect of the present invention there is provided a method of selecting between first and second directions available for transmission from a first station to a plurality of second stations in a wireless communications network, the method comprising the steps of grouping said plurality of second stations based on a traffic characteristic of respective ones thereof and selecting at said first station a transmission direction for communication with said second stations such that each of said transmission directions are used substantially equally within each said group.

The present invention seeks to provide improved methods and systems for use in the selection of radio transmission resources.

For a better understanding of the present invention and to show how the same may be carried into effect, reference will now be made by way of example only to the accompany drawings in which.

Figure 2:
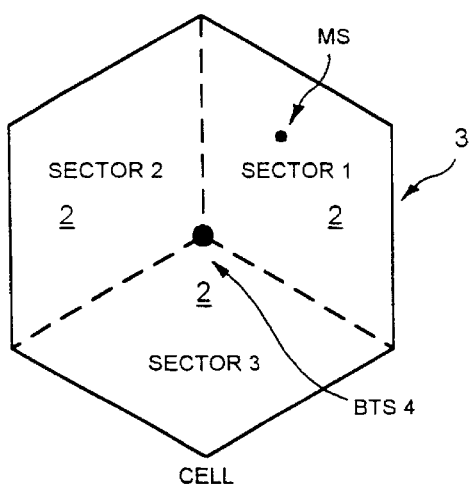
FIG. 2 is a schematic view of a base transceiver station and its associated cell sectors.

Reference will now be made to FIG. 2 which shows three cell sectors 2 of a cellular mobile telephone network. The three cell sectors 2 are served by respective base transceiver stations (BTS) 4. Three separate base transceiver stations 4 are provided at the same location. Each base transceiver station 4 has a transceiver which transmits and receives signals to and from a respective one of the three cell sectors 2. Thus, one dedicated base transceiver station is provided for each cell sector 2. Each base station 4 is thus able to communicate with mobile stations (MS) such as mobile telephones which are located in respective cell sectors 2.

Data is transmitted between the base station 4 and the mobile station in communication bursts. The communication bursts include a reference signal which is a known sequence of data. The purpose of the reference signal is generally to allow information which assists operation of the system to be obtained. This type of information includes, for example, direction of arrival information, signal strength information and delay information. In code division multiple access systems the reference signal is referred to as the pilot signal.

Embodiments will be described in the context of a code division multiple access system which uses multiple antennae (e.g. diversity antennae) at the base station. Each communication burst is transmitted in a given communication channel defined in particular by the applied spreading code. Other embodiments may be implemented using antenna arrays as will be explained hereinafter.

Figure 3:
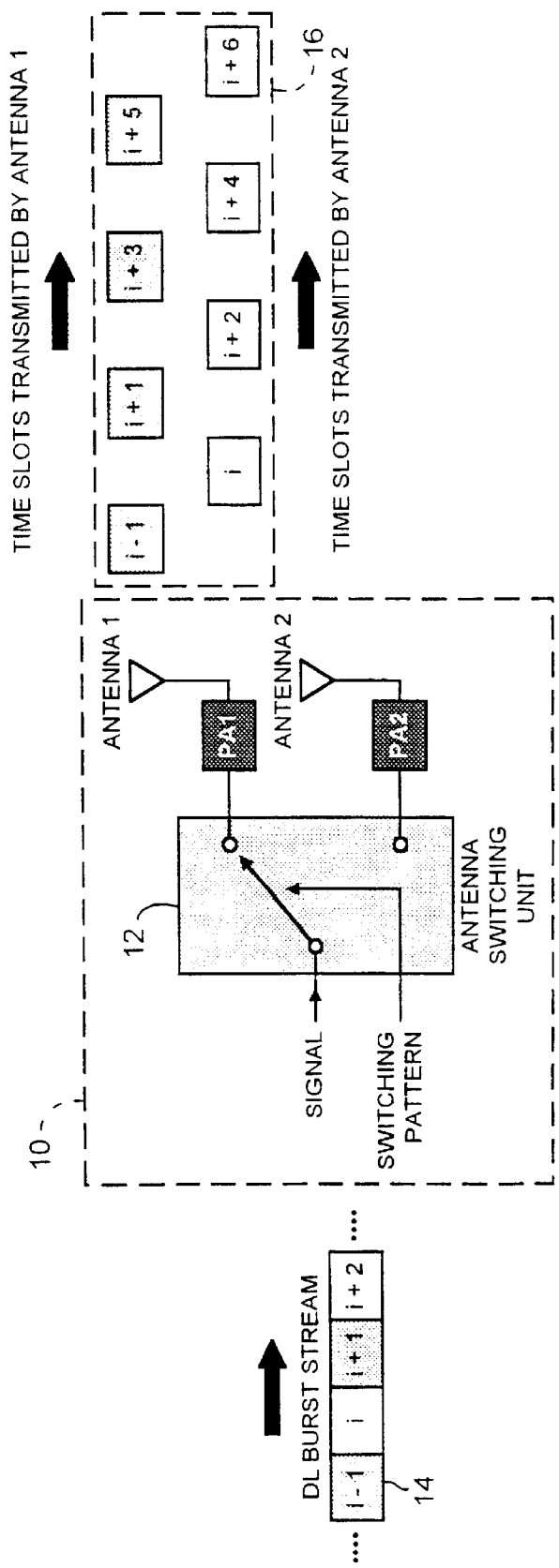
FIG. 3 is a schematic diagram illustrating the principles of time switched transmit diversity schemes.

Referring to FIG. 3, the preferred transceiver station 10 comprises a first antenna element 1 and a second antenna element 2. The first antenna element 1 is served by a first power amplifier PA1 and the second antenna element 2 is served by a second power amplifier PA2. Both of the power amplifiers PA1 and PA2 are connected to the antenna switching circuitry 12 which implements a predetermined antenna switching pattern. The downlink communication 14 to be transmitted is supplied to the antenna switching circuitry 10 and is transmitted as the downlink communication stream 16 over the air interface by alternate use of two antenna elements 1,2.

With two antenna elements 1,2 and a single user, time switched transmit diversity schemes involve selecting alternate antenna elements 1 or 2 for transmission such that signal bursts transmitted in consecutive time slots (i−1), (i), (i+1) . . . are transmitted by different antenna elements. Thus, the electrical load is alternatively switched from the power amplifier PA1 serving the first antenna 1 to the power amplifier PA2 serving the second antenna 2, and so on. Over a period of time the electrical load is equally distributed between the power amplifier PA1 serving the first antenna element 1 and the power amplifier PA2 serving the second antenna element 2. That is, if a total power P is transmitted by the two antenna elements 1,2, the mean power required by each power amplifier is P/2. Balanced and predictable electrical loading conditions such as this are advantageous because they facilitate the selection of power amplifiers with optimised characteristics. Power amplifiers can be made more efficient, smaller, more reliable and at a lower cost of production. For example, because the power amplifiers are subject to controlled loading conditions, they can operate with minimal cooling arrangements.

Figure 1:
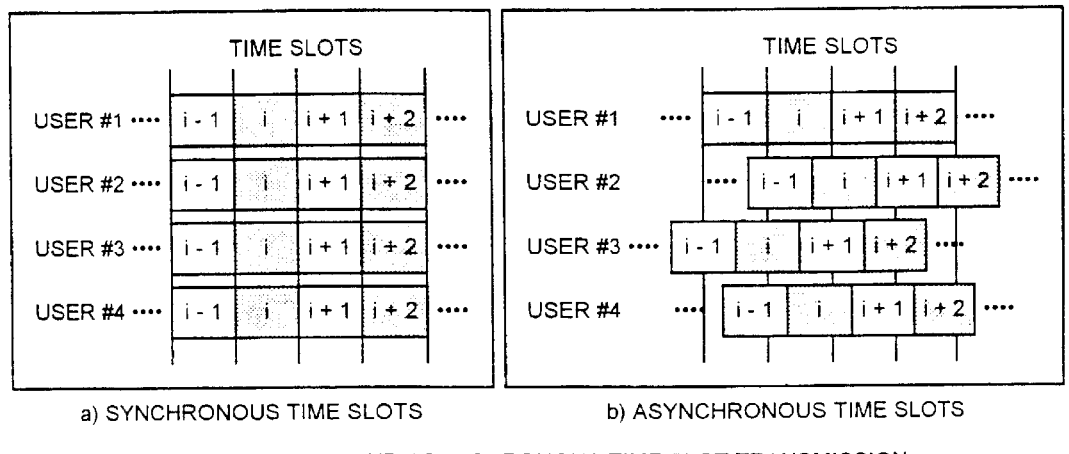
FIGS. 1a and 1b are schematic diagrams respectively illustrating synchronous and asynchronous time slot transmission.

When a plurality of equal rate users (i.e. users requiring on average similar transmit powers) operate simultaneously in the cell or cell sector served by the transceiver station 10, the electrical loading conditions of the power amplifiers PA1 and PA2 can become unbalanced. This is because in multi-user scenarios, the power loading at a given point in time depends upon the initial antenna selection made in respect of each of the plurality of users present. Unless otherwise specified, the radio transmission selection systems set out below assume that a number K of equal rate users (each requiring a power P) are connected to a transceiver station comprising two transmitting antenna elements. Each user requires the transceiver station to produce a transmit power P and the initial antenna selection is made without taking into account characteristics of the switching pattern utilised by the system thereafter. The embodiments described can be applied in either the synchronous or asynchronous scenarios of FIGS. 1a and 1b where given loading condition lasts for a complete time slot. However, the greatest problems occur and therefore most advantages will be afforded in the case of the synchronous scenario of FIG. 1a.

In a first embodiment for selecting radio transmission resources, the initial antenna selection is the same for each of the K users. For example, every time a new user is connected the first antenna 1 is selected as the initial transmitting antenna. When the initial antenna selection is controlled such that it is the same for every user in this way, then the instantaneous load will be switched alternately from a first condition in which the load on the first power amplifier PA1 equals KP and the load on the second power amplifier PA2 is zero to a second condition in which the load on the first power amplifier is zero and the load on the second power amplifier equals KP, and so on. That is, since the initially selected power amplifier is always the same (i.e. the antenna switching patterns always begin with the same antenna element), during a particular burst K users will transmit on the first power amplifier PA1 while the second power amplifier PA2 is not used, the situation being reversed in the subsequent signal burst. Thus, with this first selection method the peak loading of each amplifier increases linearly with K. For many applications it is therefore undesirable for the antenna switching patterns of all users to be initiated at the same antenna because of the high peak loads which may result.

In a second embodiment for selecting radio transmission resources, the initial antenna for use by each user is selected randomly. That is, the antenna switching pattern may start at either the first antenna 1 or the second antenna 2 with equal probability (with two antenna elements the probability Pr of either one being selected is fifty percent, Pr=0.5). When K users are present, the mean power in each power amplifier PA1, PA2 is PK/2 and thus on average the power loading of the power amplifiers PA1 and PA2 is equally balanced.

Figure 4:
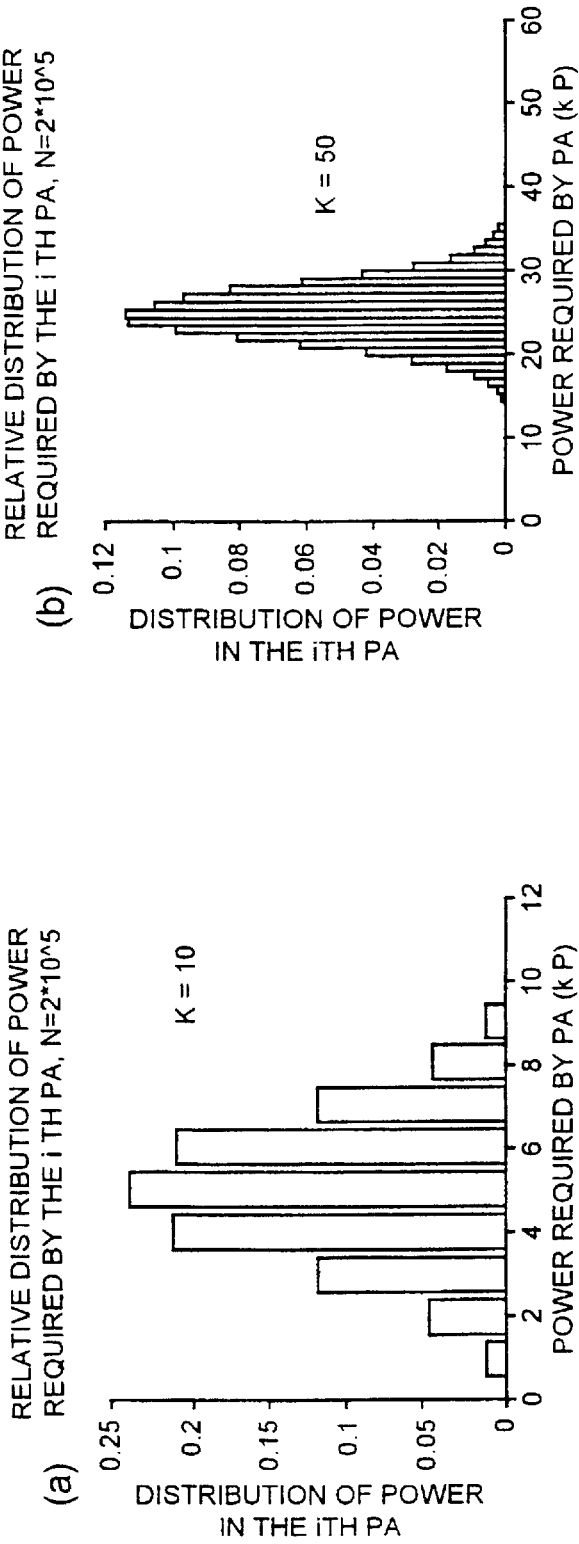
FIGS. 4a and 4b show simulated power distributions in transmission systems used by 10 users and 50 users, respectively.

FIG. 4 shows simulations of possible instantaneous loading conditions for K equal rate users and a transceiver station comprising two transmitting antenna elements. The simulations shown illustrate the likely power distributions in the ith power amplifier if each initial antenna selection is performed randomly. FIGS. 4a and 4b include examples in which 10 and 50 users are present, respectively. In both cases the most probable power amplifier loading corresponds to K/2, i.e. 5 users in the case of FIG. 4a and 25 users in the case of FIG. 4b. Thus, when the initial antenna selection (for the start of the switching pattern) is chosen randomly, the most probable loading condition is such that during a particular burst half of the users connected are using the first power amplifier PA1 and the other half are using the second power amplifier PA2, the same applying in the subsequent signal burst but with the users having switched to the opposite antenna. Where the numbers of users are sufficiently high for the laws of statistical mechanics to apply, each of the peaks represents a Gaussian distribution of users about the mean power.

Thus, according to the second embodiment for selecting radio transmission resources, there are substantially no instantaneous unbalanced power peaks. Further, the greater the number of users K, then the more likely the system is to achieve balanced loading conditions by virtue of this statistical compensation which occurs if random initial antenna selections are made.

Multi-user environments usually contain multi-rate users. For example, a wide band code division multiple access transceiver station will typically operate with many low bit rate (speech) users and a smaller number of medium and high bit rate (data) users. Higher bit rate users require more radio resources and if present usually reduce the total number of mobile stations which can be supported by the transceiver station in question. In the context of this description, a "high bit rate user" should be regarded as a user requiring high transmit power and a "low bit rate user" should be regarded as a user requiring low transmit power. Where there are a plurality of low bit rate users and relatively few high bit rate users (for example two or three), statistical compensation methods such as the second selection method described above can encounter difficulties as will be described below. Environments comprising different traffic types and relatively small numbers of users present particular problems when there is a high bit rate user with a dominant power requirement.

Figure 5:
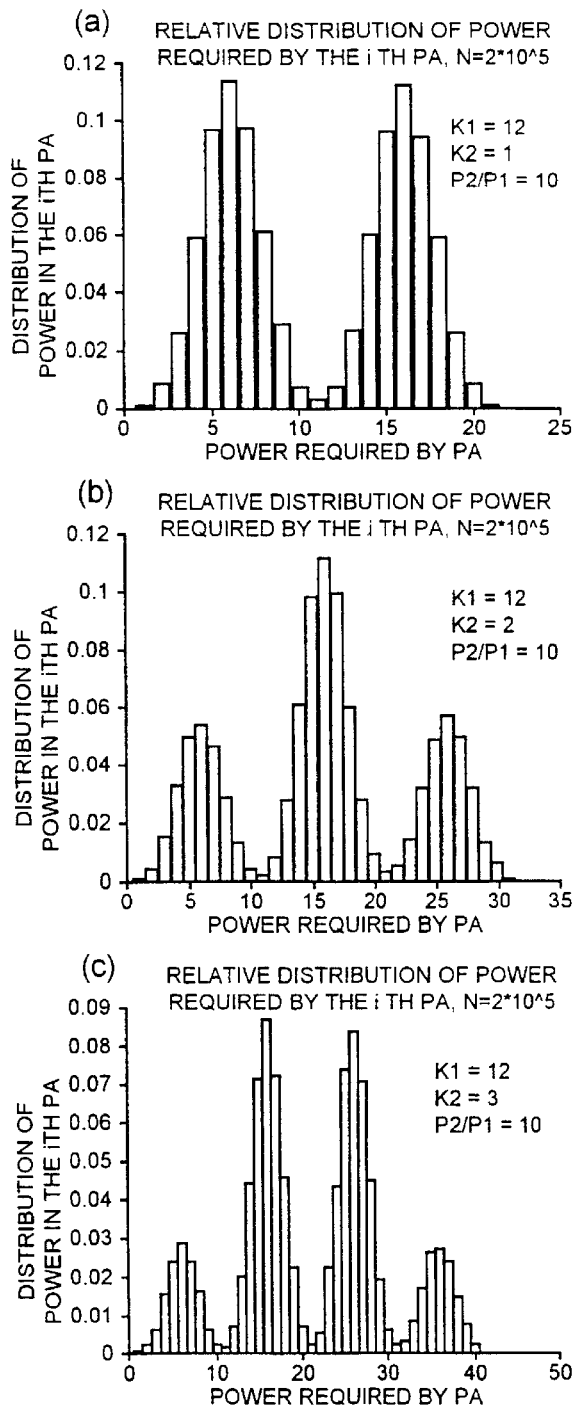
FIGS. 5a, 5b and 5c show simulated power distributions in transmission systems used by users with different power requirements.

FIGS. 5a to 5c show simulations of possible instantaneous loading conditions for mixed traffic environments. The bit rate (or equivalently power $P_2$) of each high bit rate user $K_2$ is assumed, in these examples, to be ten times larger than the bit rate (or power $P_1$) required by an individual low bit rate user.

The simulations in FIGS. 5a to 5c show the likely power distributions in the ith power amplifier if each initial antenna selection is performed randomly.

FIG. 5a illustrates the statistically likely distribution of power in a system connected to twelve low bit rate users $K_1$ and one high bit rate user $K_2$. It will be apparent that the connection of the single high bit rate user $K_2$ divides the power distribution of the twelve low bit rate users $K_1$ such that it appears over two possible power ranges. Each of the two most probable power peaks corresponds in shape to the distribution of the plurality of users shown in FIGS. 4a and 4b but number intensity is halved. The two peaks are separated by a power $P_2$ equal to that of the high bit rate user. That is, the most probable loading conditions are centred around powers equal to $K_1P_1/2$ and $K_1P_1/2+P_2$. In practice, the power in the respective power amplifiers PA1 and PA2 will oscillate between the two most probable power values.

FIG. 5b illustrates the statistical distribution of power in a system connected to twelve low bit rate users $K_1$ and two high bit rate users $K_2$. This simulation illustrates how balanced loading conditions can be achieved where there are an even number (in this case two) of power dominant users. The three most probable loading conditions are centred around powers equal to $$\left(\frac{K_1P_1}{2}\right), \left(\frac{K_1P_1}{2}+P_2\right), \text{ and } \left(\frac{K_1P_1}{2}+2P_2\right).$$

When one high bit rate user is connected to the first antenna 1, the other high bit rate user can be connected to the second antenna 2 such that the power associated with the high bit rate users is distributed evenly between the first power amplifier PA1 and the second power amplifier PA2. As a result the most probable power value is located at the centre of the distribution which is itself centred around the mean power. Statistically, the most probable situation with two power dominant users is one in which the loading conditions of the power amplifiers PA1 and PA2 are balanced.

FIG. 5c illustrates the statistical distribution of power in a system connected to twelve low bit rate users $K_1$ and three high bit rate users $K_2$. With three high bit rate users $K_2$, the most probable value is not the mean value but instead there are two equally probable power values centred around but displaced from the mean value. Referring to FIG. 5c, the four most probable power values are located at power of $$\left(\frac{K_1P_1}{2}\right), \left(\frac{K_1P_1}{2}+P_2\right), \left(\frac{K_1P_1}{2}+2P_2\right) \text{ and } \left(\frac{K_1P_1}{2}+3P_2\right)$$

and are centred around a mean value of $$\left(\frac{P_1K_1}{2}+\frac{P_2K_2}{2}\right)$$

power units.

From FIGS. 5a, 5b and 5c, it will be apparent that the presence of a given number $K_2$ of high bit rate users is effective to split the power distribution into $K_2+1$ peaks, with neighbouring peaks being centred at power values separated by a power equivalent to one high bit rate user.

The presence of high bit rate users can thus have an important effect on the over all loading conditions. As the difference in power between each high bit rate user and an individual low bit rate user increases (i.e. as $P_2/P_1$ increases), the probability of power imbalance increases. This characteristic of the systems is manifested in the null values appearing between the main distribution peaks of FIGS. 5a to 5c). That is, the greater the difference in traffic rates between the different types of users present, the larger is the potential power imbalance which may occur in the power amplifiers PA1 and PA2, particularly when the number of high bit rate users is odd (e.g. $K_2=1,3$).

In summary, if the initial antenna selection for each connected user is random and a large number K of equal rate users are present, the instantaneous loading of the power amplifiers will tend to be statistically compensated. Note however that this can only be the case if the number of users K is an even number. Owing to statistical mechanics, this balanced loading assertion becomes more probable as the number of users K increases. If the number of users is an odd number, say K−1, then the loading will still tend on average to be balanced. However, at any given instant there will inevitably be at least one statistically uncompensated user in a dual antenna system. This is because during a given signal selection condition the most probable situation is that the loading of the power amplifiers PA1 and PA2 will differ by an amount of power equal to one user.

When the users connected are low bit rate users there are fewer practical loading problems because it is unlikely that the mean power will be exceeded by a large amount. Further, in practical implementations the number of low bit rate users $K_1$ is usually large enough to ensure the laws of statistical mechanics are substantially obeyed. However, in typical mixed traffic rate systems comprising a relatively large number of low bit rate users and a few high bit rate users only the low bit rate users tend to statistically compensate for each other.

When antenna switching patterns are initiated at the same antenna, the load is alternatively switched between the power amplifiers PA1 and PA2. This results in peak power loading conditions which lead to instantaneous power imbalances. If on the other hand, the transceiver station does not take into account the initial switching pattern at all (e.g. the selection of the initial switching pattern is random) peak loading conditions at the respective power amplifiers PA1, PA2 will be statistically compensated provided the number of users is sufficiently large. In multi-rate communications networks, such as wide band code division multiple access systems, statistical compensation cannot be relied upon if, for example, there a are few dominant users and large instantaneous power imbalances can occur.

A third embodiment for selecting radio resources can minimise power imbalances in mixed traffic rate scenarios as will be explained below. Initial antenna selection for each new link according to the third embodiment is based on the previous antenna selection and/or the present loading conditions.

The plurality of users are assigned to groups based on bit rate (i.e. power) requirements. All users within a group have substantially the same bit rate. If the system comprises only speech users then a single traffic group is defined. However if the system comprises a mixture of low bit rate (speech) and high bit rate (data) users two or more traffic groups may be defined. In preferred embodiments, loading conditions are controlled within each group by making initial antenna selections for new users according to predefined rules which take into account aspects influencing the loading conditions of that group. In the embodiment presented no attempt is made to compensate loading conditions between groups nor is any consideration afforded to the initial switching pattern. Further, neither total nor partial reorganisation of the relative states of the switching patterns upon a new access or a service termination are considered. However, features based on these considerations may be incorporated into other embodiments. Every time a new user of the ith traffic group establishes a link, the initial antenna selection for the new user is:

(i) a different to the initial selection made for the preceding new entrant of that group if the last occurring event was the entry of a new user; and/or (ii) a the same as the initial selection made for the $K^{th}$ user if the last occurring event in that group was the service termination of that $K^{th}$ user.

Assuming the method is performed by a transceiver station comprising two antenna elements, selecting the opposite antenna to that of the preceding initial selection each time the last event within the group was the entry of a new user compensates loading of the power amplifiers by providing a reverse initial selection for alternate new users. Assigning a new user the same initial antenna as that used by a recently terminated user compensates for the potential power imbalance left by users as they terminate their connections.

The above initial selection rules can be applied to each traffic group independently and thus any overall power imbalances which might occur can be minimised or avoided altogether, depending on the circumstances. Note however that if only one user is present there will be a continuous loading imbalance between the power amplifiers PA1 and PA2 because they are in effect time-sharing the load. The power imbalance at any point in time will correspond to the amount of power required by that user and will in general be removed as soon as the circumstances permit. Likewise, if an odd number of users is connected the power imbalance can be limited to that corresponding to a single uncompensated user and will be removed as soon as the circumstances permit.

Figure 6:
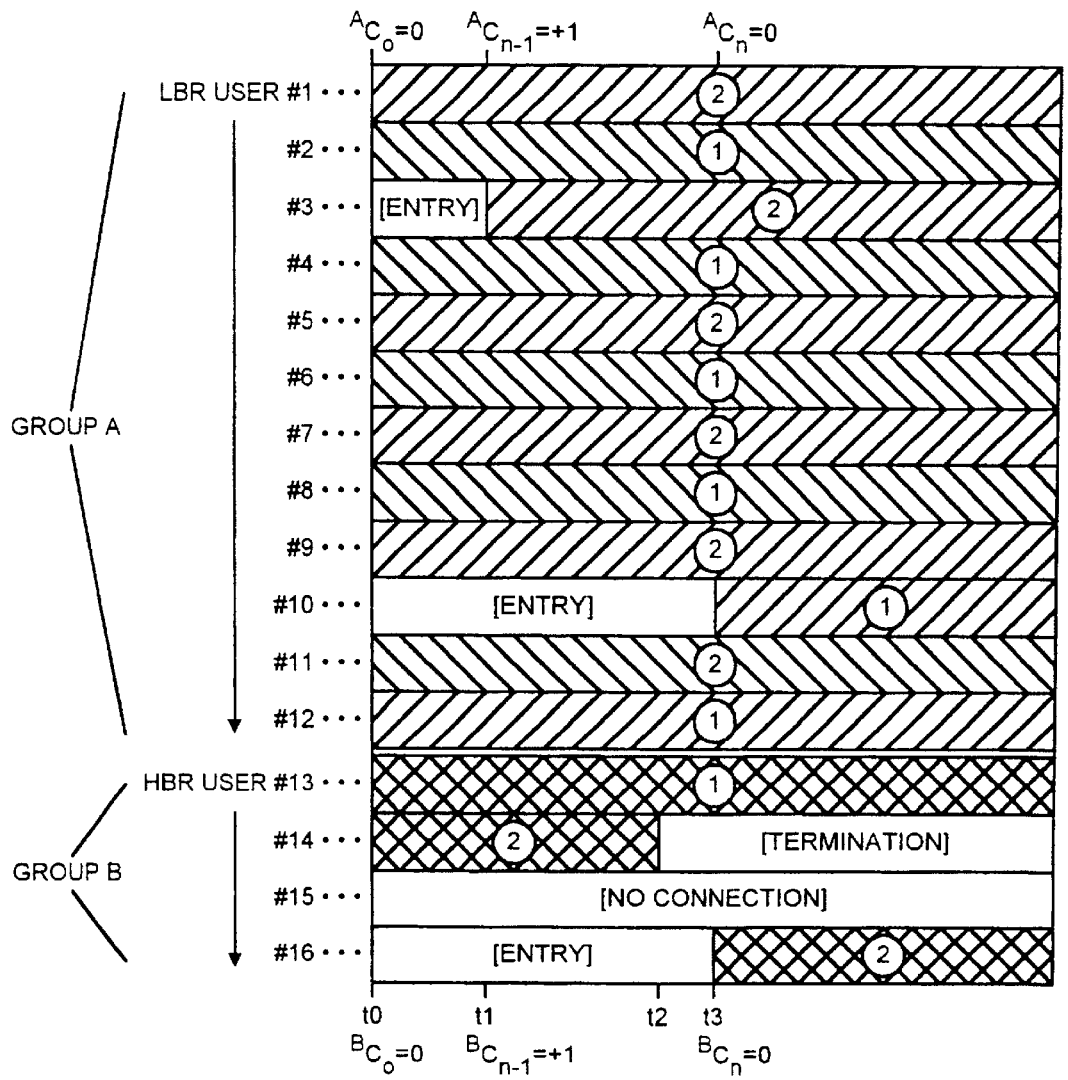
FIG. 6 is a schematic illustration of how embodiments of the present invention can achieve balanced power loading conditions.

FIG. 6 provides an illustration of how transmission resources may be selected in a mixed traffic environment comprising two groups of users categorised in terms of their respective bit rates. In FIG. 6 the signal bursts of a plurality of network users #1 to #16 (in this example mobile stations) are shown displaced vertically. The horizontal axis represents time, the shaded areas represent periods when a connection is being used and the encircled numerals indicate the initial antenna selection which was made on the connection of each new user.

A first traffic group A comprises a plurality of low bit rate uses #1 to #12 and a second traffic group B comprises a smaller number of high bit rate users #13 to #16. The loading conditions are managed independently within each of the user traffic groups A and B and in each case according to rules (i)a and (ii)a above. Consider first the low bit rate (LBR) traffic group A. At time $t_o$ the group A comprises ten connected users, namely low bit rate users #1,#2,#4,#5,#6, #7,#8,#9,#11 and #12. For ha connected users, namely #1,#5,#7,#9 and #11, the initial antenna selected was the second antenna 2 and for the other half of the connected users, namely #2,#4,#6,#8 and #12, the initial antenna selected was the first antenna 1. At time $t_o$, transmission power for the users of traffic group A is being drawn equally from the first and second power amplifiers PA1 and PA2 and the loading conditions are thus balanced.

When the new low bit rate user #10 seeks to establish a connection at time $t_3$, the antenna switching circuity 12 takes into account recent events influencing loading conditions within the group A. In this example, the last event to occur within the group A was the entry of the low bit rate user #3 at time $t_1$. Accordingly, rule (i)a above is applied and the switching circuitry 12 initially selects antenna element 1. Antenna element 1 is selected because the preceding initial antenna selection in group A (that of user #3) was antenna element 2. Note that in the period immediately following time $t_1$, the group A comprises an odd number (eleven) of connected users and the power amplifier loading conditions are susceptible to an instantaneous power imbalance corresponding to the power of a single user. However, when the next new user #10 joins at time $t_3$, the predefined rules ensure that the opposite initial antenna selection is made, thereby reestablishing balanced power amplifier loading conditions within group A at the first opportunity.

Still referring to FIG. 6, now consider high bit rate (HBR) traffic group B. At time $t_o$, the group B comprises two connected users, namely high bit rate users #13 and #14. In this example, high bit rate user #15 is not connected. In the case of the user #13 the initial antenna element selected was antenna element 1, whereas in the case of the user #14 antenna element 2 was the initial antenna selected. At time $t_o$, transmission power for the users in traffic group B is drawn equally from the first and second power amplifiers PA1 and PA2 and the loading conditions are thus balanced.

When the new high bit rate user #16 seeks to establish a connection at time $t_3$; the antenna switching circuitry 12 takes into account recent events influencing loading conditions within the high bit rate user traffic group B. In this example, the last event to occur within the traffic group B was the service termination of user #14 at time $t_2$. Accordingly, rule (ii)a above is applied and the switching circuitry 12 selects antenna element 2 as the initial antenna for the new user #16 (i.e. the same initial antenna selection as that made in the case of the recently terminated user #14). Note that in the period immediately following time $t_2$, when the high bit rate user #14 terminated its service, the group B comprised an odd number (one) of connected users and the power amplifier loading conditions were susceptible to an instantaneous power imbalance equal to an amount corresponding to the single user #13. However, when the next new user #16 joined at time $t_3$ the predefined rules ensured that the new user #16 compensated for the power imbalance left by the terminated connection of user #14, thereby re-establishing balanced power amplifier loading conditions within group B at the first opportunity.

This method can maintain an even distribution of power over the power amplifiers of the transmitting antennae in spite of dynamic changes in the network. Although this embodiment is particularly suitable for use in mixed traffic environments, it is equally applicable in single traffic environments.

Preferred transmission resource selection methods are optimal when only new entry users are considered. However, it is possible for more than one user to terminate a connection before a new connection can compensate for previous events. Any number of traffic groups may be defined by any suitable criteria. Other embodiments take into account a predetermined number N of earlier events influencing the loading conditions of the group. A fourth embodiment for selecting radio resources which can take into account such a sequence of events is described below.

The fourth embodiment includes the features of the third embodiment described herein in relation to FIG. 6. The fourth embodiment additionally involves initialising a counter in respect of each traffic group. Each counter provides signals to the antenna switching circuitry 12 and may in some implementations be incorporated therein.

The counters associated with each traffic group monitor connection and termination processes within that group as a function of time and can thus keep track of the power amplifier loading conditions of dynamic networks. For the ith traffic group a counter C is initialised such that $^iC_o=0$. Thereafter, the count of the ith group is updated at each occurrence of an event influencing the loading conditions. Whenever the first antenna 1 is the initial antenna selection for a new user, the count is incremented by one (i.e. $^iC_n=^iC_{n-1}+1$, where $^iC_{n-1}$ is the count resulting from the preceding event in the ith traffic group and $^iC_n$ is the count after the new user in question has joined the ith group) and whenever the second antenna 2 is the initial antenna selection for a new user, the count is decremented by one (i.e. $^iC_n=^iC_{n-1}-1$). In this way the count total is incrementally adjusted to reflect sequences of events affecting power amplifier loading. The initial antenna selection made when a new user joins can be controlled to compensate for any power imbalance which might exist at that time, even if two or more service terminations have occurred consecutively.

Note that in this example a count of zero indicates a balanced power amplifier load condition. Thus, according to the fourth embodiment, when a new user joins the ith traffic group the initial antenna element is selected as:

(i)b the first antenna element 1 and the count value is then incremented by one, if the count resulting from the preceding element in the group is less than zero (i.e. Antenna 1 if $^iC_{n-1}<0$, updated count $^iC_n=^iC_{n-1}+1$);

(ii)b the second antenna element 2 and the count value is then decremented by one, if the count resulting from the preceding event in the group is greater than zero (i.e. Antenna 2 if $^iC_{n-1}>0$, updated count $^iC_n=^iC_{n-1}-1$; and/or (iii)b the first antenna element 1 or the second antenna element 2 if the count resulting from the preceding event in the group is equal to zero, the count value then being incremented by one or decremented by one as appropriate (i.e. Antenna 1 or 2 if $^iC_{n-1}=0$, updated count $^iC_n=^iC_{n-1}+1$ or $^iC_n=^iC_{n-1}-1$, as appropriate)

The count $^iC_n$ is also updated as necessary upon the service termination of a user. In general, upon service termination of the $k^{th}$ user:

(iv)b the count is incremented by one if the initial antenna selection of the terminating user was antenna 2 (i.e. $^iC_n=C_{n-1}+1$).

(v)b the count is decremented by one if the initial antenna selection of the terminating user was antenna 1 (i.e. $^iC_n=C_{n-1}-1$).

With reference to FIG. 6 assume that the count $^AC_n$ for traffic group A is set to zero at the time $t_o$ ($^iC_o=0$). On entry of the first low bit rate user #3 at time $t_1$ the count is decremented by one (i.e. $^iC_{n-1}=-1$) because the initial selection for user #3 was antenna 2. On entry of the second new user #10 at time $t_3$, the count of minus one ($^iC_{n-1}=-1$) resulting from entry of the user #3 is taken into account. Thus rule (i)b above is applied. The initial selection for the second new user #10 is therefore antenna 1 and the count is incremented by one and the count value returns to zero ($^iC_n=0$) to indicate balanced loading conditions.

Assume also that the count $^BC_{nx}$ for traffic group B is set to zero at time $t_o$ ($^iC_o=0$). On service termination of the high bit rate user #14 at time $t_2$, rule (iv)b is applied and the count is incremented by one ($^iC_{n-1}=1$). On entry of the second high bit rate user #16 at time $t_3$, rule (ii)b is applied. That is, the initial selection of antenna 2 results in the count being decremented by one and the count returns to zero to indicate balanced power amplifier loading conditions ($^iC_n=0$).

Thus, if the count is non-zero, the count total within a traffic group indicates the scale of the imbalance associated with the group and the sign of the count indicates the bias of the imbalance (i.e. the system knows which antenna should be allocated as the initial antenna when the next new user joins the group in order to reestablish a balanced power distribution between the respective power amplifiers). The algorithm selects the initial antenna of each new user such that the resultant count is closer to zero. The same strategy is applied in each traffic group independently as will be explained below.

Figure 7:
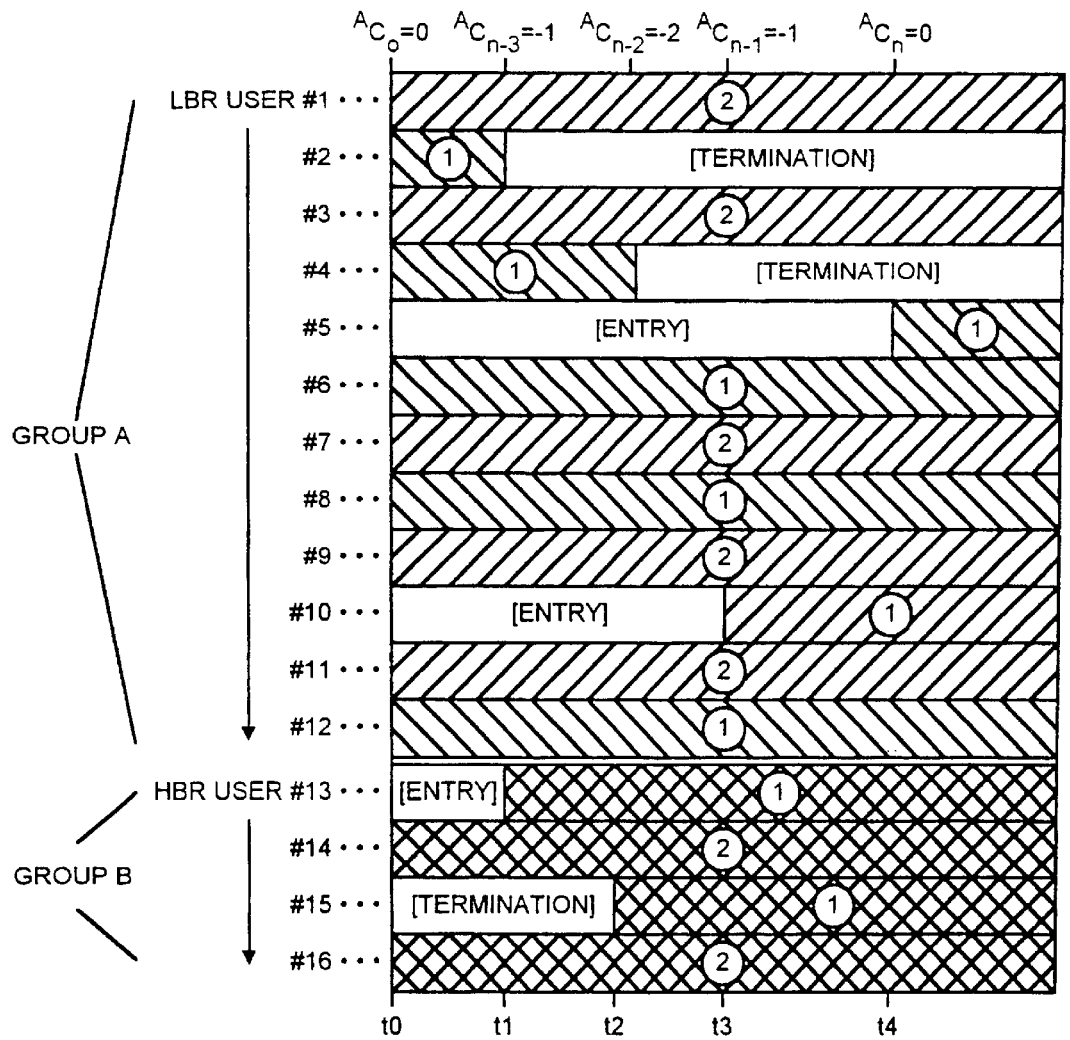
FIG. 7 is another schematic illustration of how embodiments of the present invention can achieve balanced power loading conditions.

Referring now to FIG. 7, it is illustrated how the fourth embodiment can maintain balanced power conditions even if more than one user terminates a connection before a new user can compensate therefore. The transmission bursts of a plurality of network users #1 to #16 are shown displaced vertically and the horizontal axis represents time. Shaded areas represent periods of time when a connection is in use and the encircled numerals indicate the initial antenna selection for each connection. A first traffic group A comprises a plurality of low bit rate users #1 to #12. A second traffic group B comprises a smaller number of high bit rate users #13 to #16. As with FIG. 6 the loading conditions are managed independently within each group.

Within group A ten users are connected at time $t_o$. Five of the established connections were initially designated the first antenna 1 and the remaining five were initially designated the second antenna 2. Thus at time $t_o$, the counter $^AC_o$ associated with group A reads zero, indicating balanced power loading conditions. At time $t_1$, user #2 terminates its connection and the counter is updated to read minus one ($^AC_{n-3}=-1$) because the terminating user #2 had initially selected the first antenna 1. This leaves a power imbalance corresponding to the power drawn by one low bit rate user. In this example, another low bit rate user #4 terminates its connection before a new entrant can compensate for the power imbalance left by the service termination of the user #2. At time $t_2$, the count $^AC_{n-2}$ is updated to read minus two ($^AC_{n-2}=-2$) because terminating user #4, like user #2 terminating before it, was allocated the first antenna 1 as an initial antenna selection. This leaves a power imbalance corresponding to that of two low bit rate users and thus a count of minus two. The switching circuit 12 is thus aware of the scale and bias of the power imbalance and can correct it when the establishment of new connections permits.

In the example of FIG. 7, the next two events to occur in group A are respectively the connection of new user #10 and the connection of another new user #5. When the new user #10 is connected at time $t_3$, the system reduces the power imbalance by allocating the first antenna 1 as the initial transmit antenna for that user #10. Thus at time $t_3$ the count $^AC_{n-1}$ is adjusted to read minus one ($^AC_{n-1}=-1$), indicating that the power imbalance now corresponds to the power drawn by one (low bit rate) user. When the new user #5 is connected at time $t_4$, the system eliminates the power imbalance by allocating the first antenna 1 as the initial transmit antenna for user #5, by now having compensated for the termination of both users #2 and #4. The count $^AC_n$ is updated at time $t_4$ to read zero ($^AC_n=0$), indicating that a balanced power condition has been restored. Thereafter the counter for group A is updated in dependence upon subsequent events occurring (not shown) and the count total continues to be used to compensate for power imbalances whenever the entry of a new user permits.

Thus preferred embodiments operate by identifying groups of users based on a transmission characteristic, in this example traffic rate. Preferred embodiments compensate for power imbalances in each group independently based on at least one previous event which has occurred in that group. Equally balanced power conditions can be achieved in respect of a traffic group if the number of users in the group is even. The fourth embodiment described herein can achieve balanced power conditions in systems comprising two transmit antennas whenever the number of users in the or each group is even. In general, embodiments of the present invention seek to minimise power imbalances. In a worst case, namely when the number of users in a group is odd, preferred embodiments limit the power imbalance of the traffice group in question to a maximum imbalance corresponding to the power drawn by one user of that group.

With preferred embodiments the maximum power imbalance which could result is given by $\Sigma_i P_i$ (i.e. the sum of one equivalent user power $P_i$ per group). In practice this maximum is much smaller than that corresponding to the power imbalance which might otherwise occur, that is $\Sigma_i K_i P_i$ (where $K_i$ is the number of users requiring power $P_i$ of the ith group). Thus, preferred embodiments limit the power imbalance (or maximum power peak) in the power amplifiers such that it is within the bounds.

$$O \leq \text{Power Imbalance} \leq \Sigma_i P_i \quad (1)$$

where $P_i$ is the power of one user in the ith traffic group

The power imbalance which might occur if embodiments of the present invention are not used is far greater than that which might occur if embodiments of the present invention are used. That is, expressed mathematically:

$$\Sigma_i K_i P_i >> \Sigma_i P_i \quad (2)$$

Preferred embodiments provide an effective and simple technique of minimising power imbalances between power amplifiers in transceiver stations with two or more transmitting antennae. The simplicity of preferred embodiments makes them easy to implement in radio communications networks.

For a transceiver station comprising M antennae, there are many ways of making initial antenna selections. For example, the next available (consecutive) antenna or a new random antenna etc. Preferred embodiments will afford advantages in many systems. However, because problems from imbalanced power loading conditions are alleviated as the number of transmitting antennae M increases, the advantages are most apparent in systems limited to a small number of antennae (e.g. M=2 such as in the time switched transmit diversity TSTD methods proposed for wide band code division multiple access WCDMA systems).

In one wide band code division multiple access system, preferred embodiments are implemented at the base transceiver station. Thus, switching circuitry 12 associated with the base transceiver station makes the initial antenna selection in respect of each connection established and information on the selection is transmitted to the mobile station. This information can be transferred in the form of a single bit transmitted once when the link is established. Alternatively, an initial antenna verification can be performed by the mobile station. Alternatively, other systems may be contemplated provided the necessary changes are made to the system.

The implementation should not be limited to the configurations of described embodiments. Specifically, the described embodiments provide examples of configurations which may be used to implement the preferred methods and are not intended to define the only features which should be used.

In one modification, it is possible to take into account characteristics of the switching pattern utilised by the system other than the initial antenna selection in respect of each new user. For example, the method can effect a partial or complete re-organisation of the relative states of switching patterns of connected uses upon entry or service termination of a user.

In another modification, the system attempts to compensate between groups. For example, where a single high bit rate user is present the switching patterns of a plurality of low bit rate users may be adjusted to compensate. These types of systems can operate by ensuring the product of the number of users K and the power drawn by each user is substantially the same for each antenna element. Compensations between groups can be used to eliminate or reduce any discrepancies which may occur. In one embodiment, whenever the count for a given group is zero and a new user wishes to establish a link, the initial antenna selection for that group is made based on the current power loading conditions (counts) of one or more other groups.

Systems may include more than two antenna and consequently more than two power amplifiers. In one modified version the number of antennae employed may be varied in dependence upon the number of users connected to the system. Although the examples of FIGS. 6 and 7 show two user groups it is possible for only one user group to be identified or for more than two user groups to be identified and managed simultaneously.

According to the third and fourth embodiments described herein, the user groups are defined in respect of traffic characteristics, namely rate considerations. Traffic rate is used in these embodiments as a means of identifying users having substantially equal power requirements. It should be appreciated that if the aim is to achieve balanced loading conditions of power amplifiers, other characteristics or indications of user power requirements may be used to define user groups.

Signals which are transmitted in the downlink direction may be multiplexed with respect to, for example, time, frequency, space and/or spreading code. The different methods described hereinbefore can be used separately or in any combination. Whilst embodiments have been described in the context of CDMA systems, the present invention can be used with any other type of access system.

Although preferred embodiments have been illustrated using traffic groups A and B with substantially different user structures, it is possible for two or more traffic groups to have substantially similar or identical user structures.

The embodiments described in detail herein by way of example incorporate transmission systems employing two or more diversity antennae which are well separated in space. In other applications, preferred embodiments may be implemented in systems including directional transmission functionality. Such embodiments extend the method from hopping between antennae to hopping between different directions available for transmission by facilitating selection between first and second transmission directions in, for example, systems including one or more phased antenna arrays to provide spatial division of radio channels. These embodiments may group connected users based on any criteria which affect the desirability of a direction for transmission, one object being to ensure that within a group each of the directions available for transmission are used substantially equally over time. The data transfer rate is thus one example of a criteria based on which the plurality of second stations may be grouped. Other criteria which may be taken into account by a method for selecting between different directions for transmission include, for example, interference density in a particular direction, relative power loading conditions of the various transmission branches, the maximum allowed beam power and the extent to which a given direction has been used previously.

Methods illustrated with the downlink signal direction can be applied in the uplink signal direction provided the mobile station has means to implement those methods. Embodiments of the present invention can be implemented in a mobile station as well as a base station.

What is claimed is:

1. A method of selecting radio transmission resources of a first station for communicating between said first station and a plurality of second stations in a wireless communications network, the method comprising the steps of:

grouping said plurality of second stations based on a traffic characteristic of respective ones thereof; and selecting, at said first station, radio transmission resources for communication with said plurality of second stations such that said radio transmission resources are used substantially equally within each said groups, wherein said selected radio transmission resources comprise a plurality of antenna elements for transmission from said first station to said second stations, wherein transmission schemes employed switch between respective ones of said plurality of antenna elements according to a predetermined pattern, and said selection of said radio transmission resources is controlled within each group by making an initial antenna selection at said first station for each new second station establishing a link based on a previous event influencing a balance of power between said plurality of antenna elements.

2. A method as in claim 1, wherein said plurality of second stations are grouped based on a characteristic indicative of relative power requirements thereof.

3. A method as in claim 2, wherein said plurality of second stations are grouped based on a data transfer rate characteristic such that said plurality of second stations which belong to a given group operate at substantially equal data transfer rates.

4. A method as in claim 1, wherein predetermined rules are applied within each said group to manage said selection of radio transmission resources at said first station.

5. A method as in claim 1, wherein each of said plurality of antenna elements is a component of a transmission branch, and wherein each said transmission branch is connected to antenna switching circuitry.

6. A method as in claim 5, wherein each said transmission branch comprises a power amplifier for supplying signal power to an antenna of that transmission branch under control of said antenna switching circuitry.

7. A method as in claim 1, wherein whenever one of said plurality of second stations establishes a new link and a preceding event which occurred in a relevant group was said establishment of a link, a different initial antenna selection is made to that which was made when said preceding link was established.

8. A method as in claim 1, wherein whenever one of said plurality of second stations establishes a link and a preceding event which occurred in a relevant group was a termination of a link, said initial antenna selection for said new link is made such that it is the same as said initial antenna selection made in respect of said previously terminated link.

9. A method as in claim 1,
wherein each of said plurality of antenna elements is a component of a transmission branch, and
wherein within each group said initial antenna selection is made for a new link based on loading conditions of said transmission branches at that time.

10. A method as in claim 9, wherein a counter associated with each group monitors said loading conditions of said transmission branches for that group.

11. A method as in claim 10, wherein said first station comprises first and second transmit branches and a count of zero indicates substantially balanced loading conditions for a relevant group.

12. A method as in claim 10, wherein whenever one of said plurality of second stations establishes a link and a count resulting from a preceding event which occurred in a relevant group is less than zero, a first antenna is selected as said initial antenna and said count is incremented by one.

13. A method as in claim 12, wherein whenever one of said plurality of second stations establishes a link and said count resulting from said preceding event which occurred in said relevant group is greater than zero, a second antenna is selected as said initial antenna and said count is decremented by one.

14. A method as in claim 12, wherein whenever one of said plurality of second stations establishes a link and said count resulting from said previous event which occurred in said relevant group is equal to zero, a second antenna is selected as said initial antenna and said count is decremented by one.

15. A method as in claim 10, wherein whenever one of said plurality of second stations establishes a link and a count resulting from a preceding event which occurred in a relevant group is equal to zero, a first antenna is selected as said initial antenna and said count is incremented by one.

16. A method as in claim 10, wherein a count is incremented by one each time one of said plurality of second stations terminates a link for which a second antenna was said initial antenna selection.

17. A method as in claim 10, wherein a count is decremented by one each time one of said plurality of second stations terminates a link for which a first antenna was said initial antenna selection.

18. A method according to claim 1, implemented in a wide band code division multiple access system.

19. A method according to claim 1, in which said first station comprises two transmission branches.

20. A method according to claim 1, wherein said radio transmission resources selected implement a direction of transmission in a system employing spatial division of radio channels and directional transmission.

21. A transceiver comprising circuitry for selecting radio transmission resources of said transceiver for communicating between said transceiver and a plurality of second stations in a wireless communications network, the transceiver comprising:

means for determining groups of said plurality of second stations based on a traffic characteristic of said plurality of second stations; and means for selecting, at the first station, radio transmission resources for communication with said plurality of second stations such that said radio transmission resources are used substantially equally within each said groups, wherein said selected radio transmission resources comprise a plurality of antenna elements for transmission from said first station to said second stations, wherein transmission schemes employed switch between respective ones of said plurality of antenna elements according to a predetermined pattern, and said selection of said radio transmission resources is controlled within each group by making an initial antenna selection at said first station for each new second station establishing a link based on a previous event influencing a balance of power between said plurality of antenna elements.

22. A method of selecting radio transmission resources of a first station for communicating between said first station and a plurality of second stations in a wireless communications network, the method comprising the steps of:

grouping said plurality of second stations based on a traffic characteristic of respective ones thereof;

selecting, at said first station, radio transmission resources for communication with said second stations such that said transmission resources are used substantially equally within each said group;

wherein the radio transmission resources selected from comprise two or more transmission branches for transmission from said first station to said second stations wherein transmission schemes employed switch between respective transmission branches according to a predetermined pattern;

wherein each said transmission branch comprises an antenna element; and wherein the selection of transmission resources is controlled within each group by making an initial antenna selection at said first station for each new second station establishing a link based on at least one previous event influencing the balance of the power between said transmit branches.

* * * * *